UNITED STATES PATENT OFFICE.

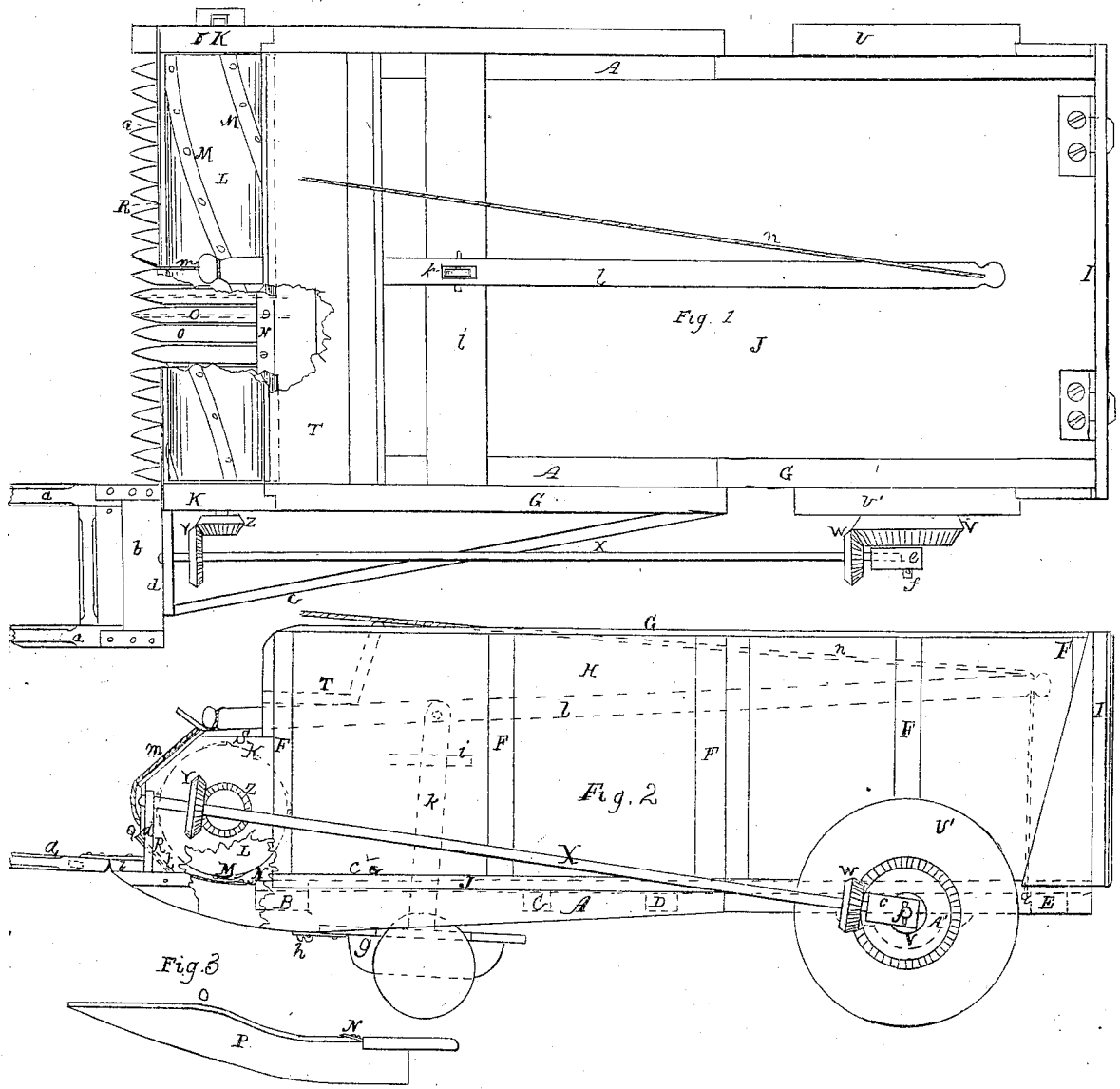
J. A. Wagener.
Clover Harvester.
No. 9750. Patented May 24, 1853

JEPTHA A. WAGENER, OF PULTNEY, NEW YORK.

IMPROVEMENT IN CLOVER-HARVESTERS.

Specification forming part of Letters Patent No. 9,750, dated May 24, 1853.

*To all whom it may concern:*

Be it known that I, JEPTHA A. WAGENER, of Pultney, in the county of Steuben and State of New York, have invented certain new and useful improvements in machines for harvesting clover, timothy, and red-top or blue grass, or other seeds, &c., also wheat and other grain; and I do hereby declare that the same is described and represented in the following specification and drawings.

Most of the machines for harvesting clover and other seeds prior to the date of my invention pull or draw the heads of clover off, and consequently pull up or break more or less of the stalks and draw them into the machine, so as to mix them with the clover-heads, rendering it more difficult to thrash, unless the stalks so gathered are first separated, which requires both time and expense. Besides, it has been found by experience that in using machines with stiff teeth for gathering clover and other seed without a straight knife to act in conjunction with the knife, knives, or scrapers, the green stalks of clover, weeds, grass, &c., which are caught between the teeth of the machine and are pulled up or broken off and carried along by it, accumulate and fill up the spaces between the teeth, so that the machine ceases to collect or gather any more seed, and the machine has to be stopped and the spaces cleared out, causing delay and loss of time, besides the labor of removing them, and this has to be done so often that the machines made previous to my invention are almost useless, and are considered of little value.

To obviate the defects above mentioned I have made certain improvements, which consist in a cylinder set with spiral knives arranged to act in combination with teeth curved to correspond with the circle traversed by the edges of the knives upon the cylinder, which act in concert with a straight stationary knife placed at the base of the teeth, so as to shear the heads of clover from the stalks, there being only sufficient space for the heads between the cylinder and the curved portion of the teeth, so that the heads and heads only are gathered; also, in making flanged teeth and cutting the top away, so as to sever the flange in front of the bar to which the teeth are joined, so as to form a seat for the stationary knife, and allow the teeth to spring and vibrate toward or from each other.

To enable others skilled in the art to make and use my invention, I will proceed to describe its construction and the mode of using it, referring to the above-mentioned drawings, in which the same letters indicate like parts in each of the figures.

Figure 1 is a plan or top view. Fig. 2 is an elevation. Fig. 3 represents one of the teeth and the end of the stationary knife.

A A are two side rails, connected together by the cross-bars B, C, D, and E, so as to form a bed, to which the other posts are connected; F F, &c., upright posts fastened to the rails A, and connected at the top by the rails G G, between which and the bottom rails there are fastened side boards, H, which, in connection with the rear board, I, and the bottom board, J, form a box or receptacle for the clover heads or seeds gathered. I fasten two pieces of plank or castings, K K, to the rails and front posts, and perforate them for the pivots of the cylinder L, which cylinder may be provided with one or more spiral knives, M M, which are fastened to it, which knives run in contact with the stationary knife N, fastened to the top of the teeth O O, as represented, which teeth are fastened to the bar B, and the knife is fastened so far forward upon the teeth that it severs the heads of clover from the stalks before the stalks come in contact with the bar B, so as to be pulled up, broken off, or drawn along by the machine. The teeth O O are made with a broad flat top, curved near the root or shank, by which they are secured to the bar B, so as to correspond with a circle formed by the rotating knives, and supported by a rib, P, the flange being cut away so as to form a seat for the stationary knife N, leaving the rib P on the under side. A side elevation of one of the teeth is shown in Fig. 3 with the knife fastened to it.

The front guard-board, Q, is fastened to the pieces K K; also, two grooved cleats, t, for the adjustable guard-plate R, (represented by a heavy dotted line,) which is designed to bear off all tall stalks and weeds and prevent them from being caught by the knives before they pass in between the teeth. The foot-board S is also fastened to the pieces K K to support the feet of the driver, who sits on the seat T, which seat is fastened to the sides of the box. The axle of the wheels U U′ turn in boxes fastened to the rails A, one of which boxes, A′, is represented in dotted lines in Fig. 2. A gear, V, is fastened to the wheel U', which turns the gear W on the diagonal shaft X and gear Y, which gear Y turns the gear Z on the shaft of the cylinder L to rotate it by the motion communicated to the wheels U U' as the machine is drawn by a horse or other animal harnessed between the shafts *a a* in some convenient manner, (which shafts *a a* are represented as broken off.) The shafts *a a* are hinged to the piece *b*, which is fastened to the rail A and supported by the brace *c*, fastened to it and to the rail, as represented. The upper end of the diagonal shaft X turns in a piece, *d*, fastened to K and *b*, as represented, and the lower end turns in a block, *e*, on the axle *f* of the wheels U U'. The forward end of the machine is supported by a small truck, *g*, with wheels, which truck is fastened to the bar B by the bolt *h*. There is a sliding standard, *k*, which traverses in the cross-piece *i* and in the bottom, as represented, the lower end resting on the truck *g*, and the upper end is connected to the lever *l*, which lever is fastened to the front board, Q, by the cord *m*. The opposite end has a hole in it for the cord *n*, which cord is fastened to the bottom of the box and passes up through the hole in the lever *l*, and is taken forward to the driver, so as to enable him to vary the range of the teeth to suit the height of the clover or other plants operated upon by the machine.

The advantages of fastening the knives to a cylinder and making them spiral, and curving the teeth to correspond with the circle traversed by the knives upon the cylinder, is this: There is only just space enough between the teeth and cylinder for the heads of clover, so that the cylinder prevents the stalks from sticking or protruding up between the teeth, as they might do if a frame or reel with or without knives was used, and with straight teeth instead of the cylinder and curved teeth. Consequently my machine, with a cylinder and curved teeth, gathers the heads with less stalks of clover or weeds than other machines, and by making the knives spiral they shear the heads off as they pass the stationary knife, and are operated with far less power and are far less liable to catch the stationary knife than if they were straight upon the cylinder, and cutting the flange on the top of the teeth serves a double purpose. It makes a space or seat for the stationary knife, and severs the flange and allows the teeth to spring and vibrate toward or from each other, which facilitates the passage of the teeth between the stalks of clover and aids in preventing them from becoming clogged by an undue proportion of stalks getting into a single space and but few in the adjacent space or spaces, as the teeth yield or spring and enlarge the space, which is crowded, and permits the mass to pass in, so that the heads are cut off by the knives upon the cylinder when the stalks are drawn or slip out and the teeth return to their usual position, for in other machines, which have stiff triangular teeth, the accumulation of stalks in the spaces between the teeth soon clog them, so as to require the machine to be stopped and the spaces cleared before any more are gathered, causing delay and loss of both time and labor.

What I claim as my invention in the above-described machine for harvesting clover-heads without the stalks is—

1. The arrangement of the solid or hollow cylinder set with knives on its periphery, as described, and just near enough to the fixed knife or to the concave of the fingers to admit space enough to allow the clover-heads to pass through without being crushed, and so that by the combined action of the forward movement of the machine and the adjustable guard-plate R and the knives the stems may be drawn in and severed close to the heads.

2. Making the teeth so that they will spring and vibrate toward or from each other, substantially as described and represented.

In testimony whereof I have hereunto signed my name before two subscribing witnesses.

J. A. WAGENER

Witnesses:
   EDWD. G. DENNIS,
   J. DENNIS, Jr.